United States Patent
Capan et al.

(10) Patent No.: US 10,954,866 B2
(45) Date of Patent: Mar. 23, 2021

(54) FLAP DEVICE FOR AN INTERNAL COMBUSTION ENGINE

(71) Applicant: PIERBURG GMBH, Neuss (DE)

(72) Inventors: Alpay Capan, Schwalmtal (DE); Franz Dellen, Willich (DE); Christian Antoni, Cologne (DE); Ahu Bendig, Neuss (DE); Hasan Oezcan, Neuss (DE); Philipp Herten, Korschenbroich (DE)

(73) Assignee: PIERBURG GMBH, Neuss (DE)

( * ) Notice: Subject to any disclaimer, the term of this patent is extended or adjusted under 35 U.S.C. 154(b) by 0 days.

(21) Appl. No.: 16/340,692

(22) PCT Filed: Sep. 27, 2017

(86) PCT No.: PCT/EP2017/074496
§ 371 (c)(1),
(2) Date: Apr. 10, 2019

(87) PCT Pub. No.: WO2018/069049
PCT Pub. Date: Apr. 19, 2018

(65) Prior Publication Data
US 2019/0309690 A1    Oct. 10, 2019

(30) Foreign Application Priority Data

Oct. 12, 2016   (DE) .................. 10 2016 119 426.3

(51) Int. Cl.
*F02D 9/10*       (2006.01)
*F02M 35/10*      (2006.01)
(Continued)

(52) U.S. Cl.
CPC .......... *F02D 9/1015* (2013.01); *F02D 9/101* (2013.01); *F02M 9/08* (2013.01);
(Continued)

(58) Field of Classification Search
CPC ................... F02D 9/1015; F02D 9/101; F02D 2200/0414; F02D 2400/18;
(Continued)

(56) References Cited

U.S. PATENT DOCUMENTS 2,680,592 A * 6/1954 Zierer ..................... F02D 9/101
251/305
3,903,215 A * 9/1975 Cole ........................ F02M 7/22
261/50.2

(Continued)

FOREIGN PATENT DOCUMENTS

DE          43 29 527 A1    3/1995
DE    10 2006 001 032 A1    9/2006
(Continued)

*Primary Examiner* — Syed O Hasan
(74) *Attorney, Agent, or Firm* — Norman B. Thot

(57) ABSTRACT

A flap device for an internal combustion engine which includes a flow housing with a housing wall which delimits a flow-through duct. The flap device includes a shaft mounted in the flow housing, a flap body rotatably mounted on the shaft, an actuator for the shaft, and a pressure measurement point. The pressure measurement point is arranged in a duct section of the flow housing so that the flap body traverses the pressure measurement point when rotating, and in a region of the flow housing remote from the shaft when viewed in a circumferential direction of the housing wall. A flap surface of the flap body is directed towards the pressure measurement point and is curved so that, in each rotary position, a tangent arranged at the position of the curved flap surface having a shortest distance to an opposite wall surface of the flow housing is parallel thereto.

13 Claims, 4 Drawing Sheets

(51) Int. Cl.
*F16K 1/22* (2006.01)
*G01F 1/40* (2006.01)
*F16K 37/00* (2006.01)
*F16K 31/04* (2006.01)
*F02M 9/08* (2006.01)
*F02D 9/02* (2006.01)

(52) U.S. Cl.
CPC ......... *F02M 35/1038* (2013.01); *F16K 1/221* (2013.01); *F16K 1/222* (2013.01); *F16K 31/041* (2013.01); *F16K 37/005* (2013.01); *G01F 1/40* (2013.01); *F02D 2009/0201* (2013.01); *F02D 2200/0414* (2013.01); *F02D 2400/18* (2013.01)

(58) Field of Classification Search
CPC ........... F02D 2009/0201; F16K 37/005; F16K 31/041; F16K 1/222; F16K 1/221; F02M 35/1038; F02M 9/08; G01F 1/40
See application file for complete search history.

(56) References Cited

U.S. PATENT DOCUMENTS

| | | | |
|---|---|---|---|
| 4,420,438 A | 12/1983 | Goosen | |
| 4,549,517 A * | 10/1985 | Kamiyama | F02D 41/0002 123/399 |
| 5,669,350 A | 9/1997 | Altmann et al. | |
| 5,741,006 A * | 4/1998 | Murai | F16K 1/221 251/305 |
| 5,845,748 A | 12/1998 | Schaefer et al. | |
| 6,003,490 A * | 12/1999 | Kihara | F02D 9/1015 123/337 |
| 6,047,950 A * | 4/2000 | Pontoppidan | F02D 9/10 123/337 |
| 6,129,071 A * | 10/2000 | Pursifull | F02D 9/1015 123/337 |
| 6,446,600 B1 * | 9/2002 | Scherer | F02D 11/10 123/399 |
| 7,320,220 B1 | 1/2008 | Atkinson | |
| 7,788,019 B2 * | 8/2010 | Yamashita | F02D 13/0226 701/107 |
| 7,926,271 B2 * | 4/2011 | Nemeth | F02D 9/02 60/605.1 |
| 10,221,814 B2 * | 3/2019 | Montigny | F16K 47/08 |
| 2004/0079327 A1 * | 4/2004 | Andoh | F02M 21/10 123/337 |
| 2006/0174101 A1 * | 8/2006 | Bluhm | G06F 16/27 713/2 |
| 2006/0174701 A1 * | 8/2006 | Musashi | F02D 41/18 73/114.31 |
| 2008/0168965 A1 * | 7/2008 | Shimura | F02D 9/108 123/337 |
| 2015/0096533 A1 * | 4/2015 | Hiramoto | F02D 41/222 123/403 |
| 2016/0169087 A1 * | 6/2016 | Yamazaki | F02B 25/20 123/73 A |
| 2017/0009677 A1 * | 1/2017 | Brinkmann | F02M 35/1038 |
| 2017/0037786 A1 * | 2/2017 | Fabien | F02D 41/145 |
| 2017/0314497 A1 * | 11/2017 | Tomomatsu | F02D 41/1458 |
| 2017/0350326 A1 * | 12/2017 | Shibaike | F02D 21/08 |
| 2018/0051610 A1 * | 2/2018 | Thomas | F01N 1/026 |
| 2018/0266567 A1 * | 9/2018 | Hadley | F16K 1/2268 |

FOREIGN PATENT DOCUMENTS

| | | | | |
|---|---|---|---|---|
| DE | 102006001032 | * | 9/2006 | ............ G01F 1/363 |
| DE | 102006001032 A1 | * | 9/2006 | ............ G01F 1/363 |
| EP | 1 947 312 A1 | | 7/2008 | |
| JP | 2005-337198 A | | 12/2005 | |

* cited by examiner

FLAP DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2017/074496, filed on Sep. 27, 2017 and which claims benefit to German Patent Application No. 10 2016 119 426.3, filed on Oct. 12, 2016. The International Application was published in German on Apr. 19, 2018 as WO 2018/069049 A1 under PCT Article 21(2).

FIELD

The present invention relates to a flap device for an internal combustion engine, comprising a flow housing in which a flow-through duct is formed that is delimited by a housing wall, a flap body that is rotatably arranged on a shaft and mounted in the flow housing via the shaft, an actuator that is used to actuate the shaft, and a pressure measurement point in a duct section of the flow housing which the flap body can traverse when rotating and which is arranged in the region of the flow housing that is remote from the shaft as viewed in circumferential direction of the housing wall of the flow housing.

BACKGROUND

The swivel section traversed by the flap body is the axial section of the duct whose cross sections relative to the duct axis are contacted by a flap section in any position of the flap. The area remote from the shaft in a circumferential direction of the housing wall is the area of the housing wall that, in the case of a centrally mounted flap, is offset by 90° in relation to the shaft axis.

Such flap devices are in particular used in internal combustion engines of vehicles, for example, to control a fresh air flow supply to the cylinders or an exhaust gas flow recirculation to the intake manifold in order to reduce pollutants.

Various control strategies have been developed since known applications require a control of the flaps depending on a volumetric flow or a mass flow of the gas. It is known, for example, to use a position sensor to control the flaps, which is then calibrated so that a gas flow is assigned to each position of the flap body or the shaft under the same ambient conditions, which, however, leads to inaccurate control during operation since not all ambient conditions can be taken into account. For exhaust gas recirculation, it is also known to carry out the control depending on other measured engine characteristics and to then readjust the exhaust gas recirculation flap.

Particularly in the intake area of the engine, it is also known to use airflow meters which operate according to the principle of hot-film anemometry, or to determine the gas flow with a differential pressure measurement.

Such a differential pressure measurement in the exhaust gas area is described in U.S. Pat. No. 7,320,22 B1 where a Venturi nozzle is used to determine an exhaust gas mass flow by using a pressure difference sensor which measures before the constriction and in the narrowest cross section of the nozzle, and where the determined values are used to control an exhaust gas recirculation flap that is arranged downstream of the Venturi nozzle. The reaction time is thereby reduced, and sufficient measurement and control values are achieved in most operating conditions. Such a measurement can, however, be problematic for a small desired quantity of exhaust gases or for small opening cross sections of the exhaust gas recirculation valve. The speeds in the area of the Venturi nozzle in these operating conditions are so low that measurement errors significantly increase in percentage to the actual exhaust gas quantity.

A volumetric flow measurement in the area of a throttle flap arranged in an air duct is also described in DE 10 2006 001 032 A1 where a differential pressure is measured between a pressure measurement point upstream of the flap body and a pressure measurement point arranged in an axial section of the duct, which is traversed when the flap body rotates. It has been shown, however, that in the case of smaller opening angles of the flap body point turbulences can occur in the area of the downstream pressure measurement, which point turbulences lead to pressure variations and thus prevent accurate measurements.

SUMMARY

An aspect of the present invention is to provide a flap device with which an existing pressure difference can be precisely determined to calculate a precise volumetric flow or mass flow in all operating conditions, in particular for smaller gas flows, in order to control the position of the flap depending on the measured pressure difference. A further aspect of the present invention is to thereby eliminate the use of position sensors.

In an embodiment, the present invention provides a flap device for an internal combustion engine. The internal combustion engine includes a flow housing which comprises a housing wall which is configured to delimit a flow-through duct. The flap device includes a shaft mounted in the flow housing, a flap body rotatably mounted on the shaft, an actuator configured to actuate the shaft, and a pressure measurement point. The flap body comprises a curved flap surface. The pressure measurement point is arranged in a duct section of the flow housing so that the flap body traverses the pressure measurement point when rotating, and in a region of the flow housing which is remote from the shaft when viewed in a circumferential direction of the housing wall. In a cross section perpendicular to the shaft and running through the pressure measuring point, the curved flap surface directed towards the pressure measurement point is curved so that, in each rotary position of the flap body, a tangent arranged at the position of the curved flap surface having a shortest distance to an opposite wall surface of the flow housing is parallel to the opposite wall surface of the flow housing.

BRIEF DESCRIPTION OF THE DRAWINGS

The present invention is described in greater detail below on the basis of embodiments and of the drawings in which.

DETAILED DESCRIPTION

Figure 1:
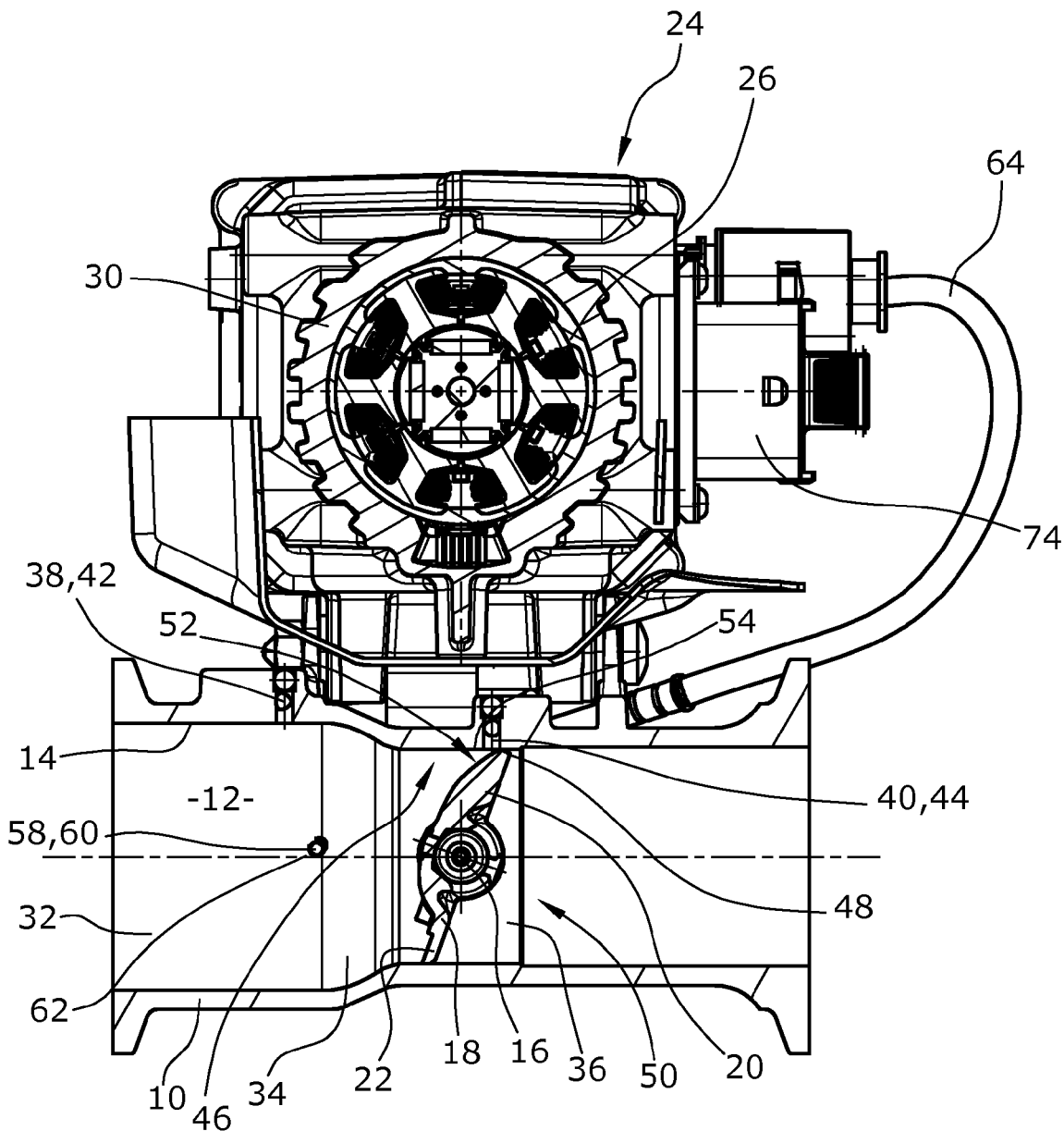
FIG. 1 shows a side view of the flap device according to the present invention in a sectional view.
Figure 2:
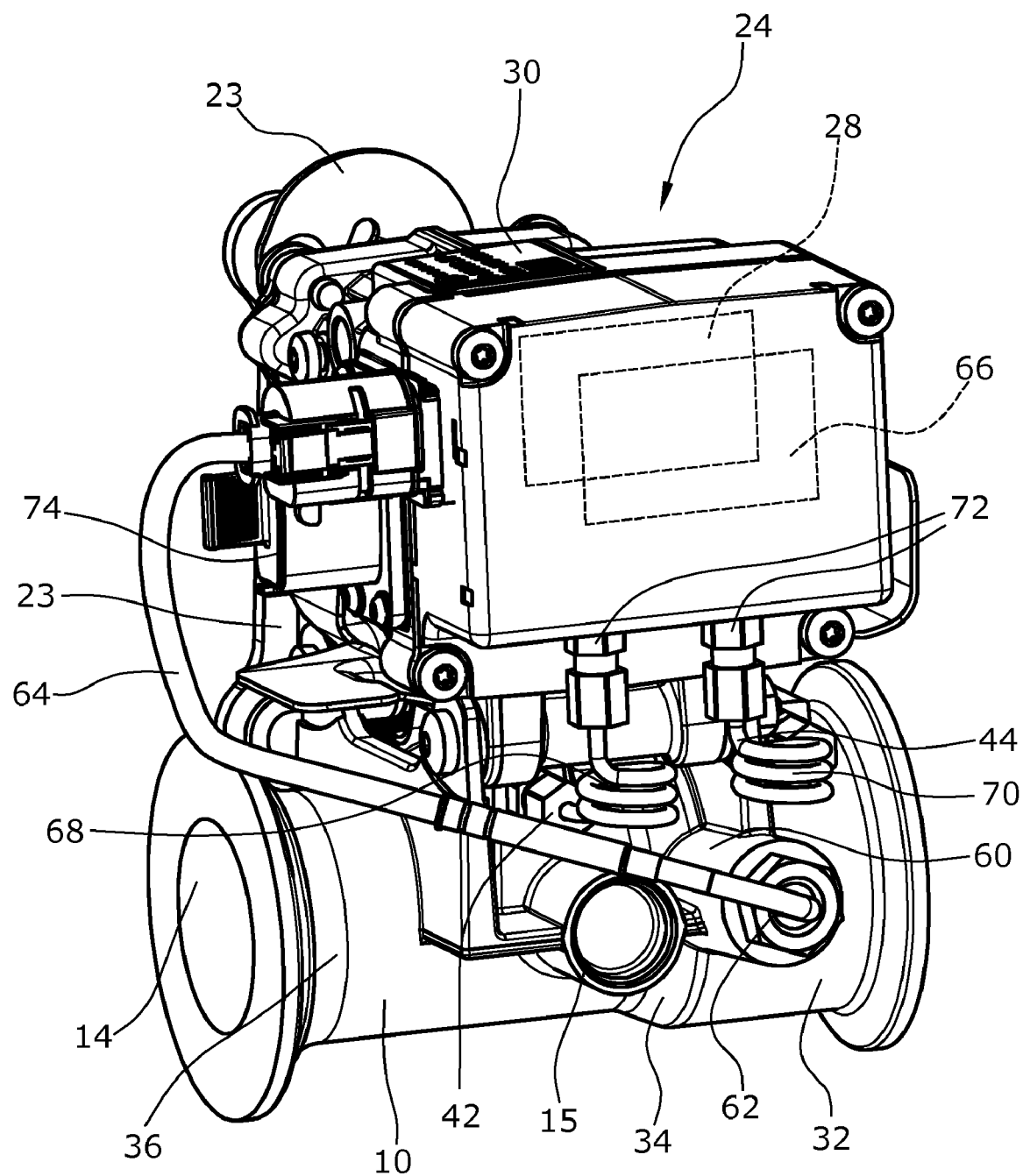
FIG. 2 shows a flap device according to the present invention from an opposite side in a perspective view.
Figure 3:
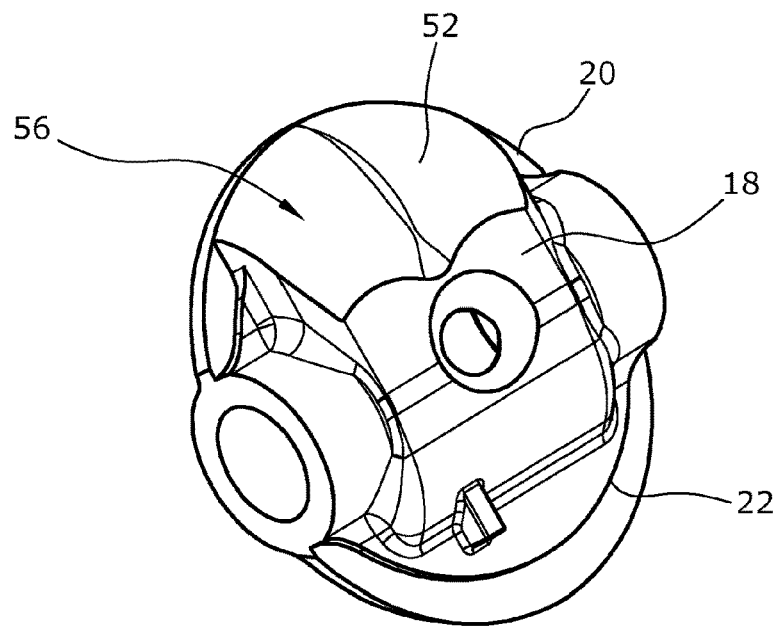
FIG. 3 shows a perspective view of the flap body of the flap device according to the present invention in FIG. 1.

In a cross section perpendicular to the shaft and running through the pressure measuring point, the flap surface directed towards the pressure measurement point is curved so that, in each rotary position of the flap body, a tangent placed at the position of the curved flap surface having the shortest distance to the opposite wall surface runs parallel to the opposite wall surface of the flow housing, thus achieving a directed, straight flow without vortices along the pressure measurement point and a significant improvement of measurement results. The flap surface is thus always parallel to the wall surface in this cross section running perpendicular to the flow in the smallest opened flow cross section on the flap body, whereby a respective parallel and laminar flow along the pressure measurement point is provided.

In an embodiment of the present invention, the tangent placed at the position of the curved flap surface having the shortest distance to the opposite wall surface can, for example, be arranged in each rotary position of the flap body in a same axial flow cross section of the duct in the swivel area of the flap body, whereby this narrowest cross section is always arranged in the same flow cross section, whereby a constant flow is maintained even when the flap body rotates.

In an embodiment of the present invention, the axial flow cross section of the duct in which the tangent placed at the position of the curved flap surface having the shortest distance to the opposite wall surface is arranged in each rotary position of the flap body, can, for example, be arranged directly downstream of the pressure measurement point so that the parallel gas flows are also received directly behind the pressure measurement point so that a directed, straight flow is thus achieved, which leads to precise pressure measurements.

In an embodiment of the present invention, the flap body can, for example, comprise a flap wing on which the curved flap surface is formed and which is arranged in a closed state of the flap device directly downstream of the pressure measurement point on the wall surface of the flow housing on a suspension point on the wall surface of the flow housing and which moves away from the pressure measurement point and thus from the position closing the duct while the flap body rotates. This embodiment provides that the pressure measurement point is in the maximum flow-through range in a narrow cross section even with a small flap opening, while no vortices are caused by the flap body. A directed flow of high speed is instead formed in this area, leading to a precise pressure measurement. This reduces measurement errors and provides a reliable pressure measurement in the entire adjustment range of the flap over a long period of time. The form of the flap that is more complex to produce is also limited to the section required for the precise measurements.

It is further advantageous if, as viewed in circumferential direction from the suspension point, the curvature of the wall surface of the flow housing corresponds to the curvature of the opposite curved flap surface in the respective various rotary positions. The parallelism of the flow is thereby maintained over a wide flow section and vortex formation is prevented, thus achieving an additional improvement in the measurement results.

The pressure measurement point can, for example, be formed downstream of the bearing positions of the shaft at the flow housing so that the flap is arranged transversely in the duct in a closed state. This simplifies the formation of the curvature for creating the directed flow. Separation edges can thereby be prevented in the case of small opening angles.

A further embodiment of the present invention is the curved flap surface which is only formed along the shaft in the middle area of the flap wing. Material is thereby saved since the expansion of the curvature is reduced. The parallelism in the area of the pressure measurement point and the obtained good results are, however, still maintained.

In an embodiment of the present invention, the flap device can, for example, comprise a first duct section with a first flow cross section, and a second duct section in which the flow cross section is reduced, and downstream of the second duct section a third duct section in which the duct continues with reduced flow cross section, wherein the shaft is arranged in the third duct section and the pressure measurement point is formed in the third duct section. This constriction upstream of the flap allows for a more precise differential pressure measurement.

In an embodiment of the present invention, a further pressure measurement point can, for example, be arranged for this purpose in the first duct section, wherein the pressure measurement points are formed as openings in the housing, which are in fluid communication with at least one pressure sensor. The pressure can be directed through the opening into a housing or directly to two individual pressure sensors or a differential pressure sensor, which can then be used to precisely determine the volumetric flows from the differential pressures.

It is correspondingly advantageous if a pressure sensor is arranged in each of the two openings of the flow housing. This simplifies assembly. It is also simple to produce a leak-free cap for the opening.

It is alternatively advantageous if the at least one pressure sensor is a differential pressure sensor. This makes it possible to measure and calculate a mass flow with only one component.

In an embodiment of the present invention, a control electronic of the actuator can, for example, be electronically coupled with the at least one pressure sensor. The actuator and thus the flap are correspondingly controlled depending on the measurement values of the at least one pressure sensor, whereby additional position sensors on the actuator are not required since a direct back-coupling can be carried out via the desired volumetric flow to be conveyed.

It is further advantageous if an evaluation unit for calculating a gas flow from the measurement values of the at least one pressure sensor is electronically coupled with the at least one pressure sensor and with the control electronic of the actuator. Such a device can be used to determine a precise mass flow initially from the pressure measurement values and other additional measurement values, such as the temperature, wherein the mass flow is subsequently used as an actual value when controlling the valve and is compared for the actuator with the target value. A control thus takes place directly depending on the mass flow relevant for the engine control as a control variable.

The actuator is thus controlled depending on the measurement value of the at least one pressure sensor.

A particularly simple assembly, which also enables a pre-assembly of the entire flap device, is achieved if the control electronic of the actuator and the at least one pressure sensor are arranged in an actuator housing that is mounted on or integrally formed with the flow housing. This means that the entire electronics is arranged in a common housing and that the units can be directly coupled to each other formed on a common circuit board.

A flap device is thereby provided which enables precise measurement values for a mass flow or a volumetric flow to be determined and is at the same time small and compact and can be pre-assembled. This is achieved by a directed layered flow without turbulence and vortices, whereby the pressure sensors provide significantly more precise measurement values. The number of parts and the required assembly steps are reduced compared to known embodiments. The flap can thus be controlled depending on the volumetric flow or the mass flow calculated from the pressure difference without having to use additional sensors. This enables a direct, faster and more precise control of the gas flows required by the engine control.

An exemplary embodiment of a flap device according to the present invention is shown in the figures and is described below.

The flap device according to the present invention comprises a flow housing 10 in which a flow-through duct 12 is formed that is delimited by a surrounding housing wall 14 of the flow housing 10. Two bearing positions 15, in which a shaft 16 is rotatably mounted, are formed at the two radially arranged opposite sides of the duct 12 in the flow housing 10. A flap body 18 is mounted on the shaft 16 via which a mass flow of a gas can be controlled by rotating the shaft 16 in the duct 12, wherein the shaft 16 divides the flap body 18 into one first flap wing 20 and one second flap wing 22.

To generate the rotational movement, one end of the shaft 16 protruding from the flow housing 10 is connected, for example, via a lever linkage 23 to an actuator 24 consisting of an electric motor 26 and, if required, a downstream gear, which are arranged in an actuator housing 30 with the control electronic 28 of the actuator 24.

The duct 12 comprises three axially successive duct sections 32, 34, 36, wherein the first duct section 32 has the largest diameter or flow cross section. A second duct section 34, which is formed as a constriction, is connected to the first duct section 32 so that in its course the flow cross section is constantly reduced to a minimum diameter. From this smallest cross section, the duct 12 continues with this reduced diameter in the third duct section 36, in which the bearing of the shaft 16 of the flap body 18 is also arranged.

Two openings 38, 40 are formed in the duct 12, the two openings 38, 40 serving as pressure measurement points 42, 44. A first opening 38 is located in the first duct section 32, while a second opening 40 is located in the third duct section 36 and is thus formed behind the constriction. Viewed in a circumferential direction of the housing wall 14, both the first opening 38 and the second opening 40 are at the same height, which means that they are arranged axially behind each other and offset on both sides by 90° relative to the bearings of the shaft 16 and thus viewed in a circumferential direction in an area 46 of the flow housing 10 remote from the shaft 16.

Figure 4:
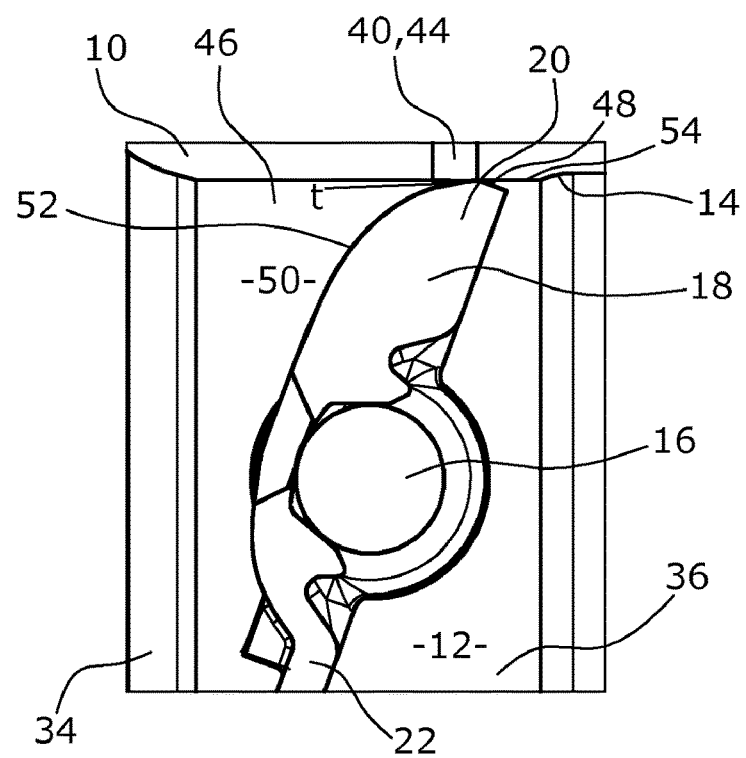
FIG. 4 schematically shows the flap device in a first rotary position of the flap body.
Figure 5:
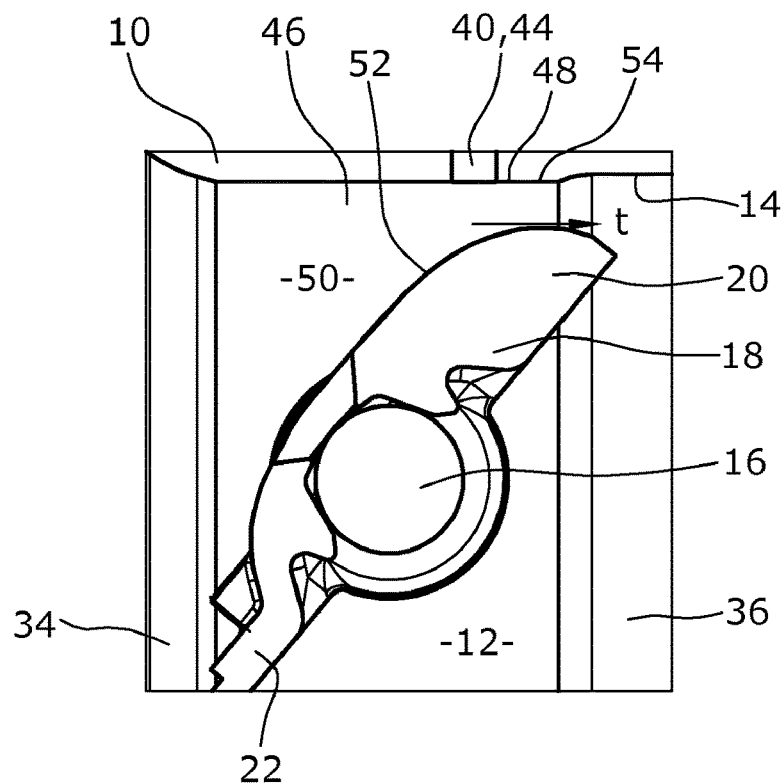
FIG. 5 schematically shows the flap device in a second rotary position of the flap body.
Figure 6:
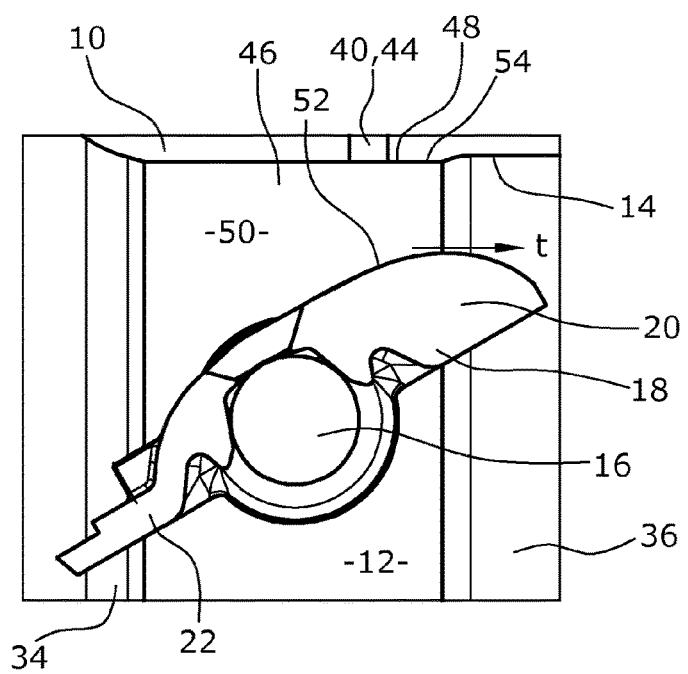
FIG. 6 schematically shows the flap device in a third rotary position of the flap body.

The flap body 18 is located in the position shown in FIG. 1 in its position closing the flow cross section of the third duct section 36. In this position, the flap body 18 is located directly downstream of the second opening 40, as viewed in the flow direction, at a suspension point 48 on the housing wall 14. When the flow cross section is opened, as is shown in FIGS. 4-6, the first flap wing 20 directed to the second opening 40 is rotated in the flow direction and thus in the direction moving away from the second opening 40, while the second flap wing 22 is rotated to the flow upstream, respectively. Pressure changes at this pressure measurement point 44 are already measurable for very small opening angles of the flap body 18 since the pressure measurement point 44 is arranged in the area in which, in case of a small opening of the flap body 18, a maximum flow cross section is released for the gas and thus a measurable flow exists.

To obtain the most accurate results possible, the pressure measurement point 44 formed in the third duct section 36 is arranged within a swivel section 50 of the flap body 18 respectively within the axial section of the third duct section 36 traversed by the flap body 18 when the flap body 18 rotates. A flow at the pressure measurement point 44 is thus initially provided for all opening angles.

The present invention provides that a constantly directed flow without vortex formation is additionally provided along the pressure measurement point 44 by a flap surface 52 of the flap body 18 on the first flap wing 20 directed to the pressure measurement point 44, wherein the flap surface 52 is curved to an outer circumference of the flap body 18. This flap surface 52 is designed so that the flap surface 52 is always parallel to an opposite wall surface 54 of the housing wall 14 of the flow housing 10 in the area of the suspension point 48 remote from the shaft 16 and independent of the respective rotary position of the flap body 18.

If a cut is made perpendicular to the shaft 16 in the area of the pressure measurement point 44 or in the area of the suspension point 48 offset by 90° of the shaft 16, a tangent t placed at the flap surface 52 in the area having the shortest distance to the opposite wall surface 54 is always parallel to the opposite wall surface 54. The flow cross section in which the flap surface 52 has the shortest distance to the opposite wall surface 54 is located in this exemplary embodiment directly downstream of the pressure measurement point 44 and independent of the rotary position of the flap body 18.

This parallel position of the flap surface 52 to the opposite wall surface 54 must, however, always be formed in the swivel area 50 of the flap body 18 at or behind the pressure measurement point 44 in order to receive precise measurement values at the pressure measurement point 44.

Viewed in the direction of the shaft 16, the curved flap surface 52 extends exclusively in a middle area 56 of the first flap wing 20 in which the greatest flow is expected, and which has the greatest influence on the measurement values at the pressure measurement point 44 in terms of flow. The curvature, viewed in an axial direction of the shaft 16, is also approximately adapted to the rounding of the opposite wall surface, whereby a vortex formation in the lateral area of the pressure measurement point 44 is avoided since a constantly growing cross section is always released when the flap opens.

A third opening 58 is additionally formed in the first duct section 32, the third opening 58 serving as a temperature measurement point 60 and being offset in the exemplary embodiments by 90° relative to the first opening 38. A temperature sensor 62 is mounted on the third opening 58, the temperature sensor 62 being electrically connected via a line 64, which leads to the actuator housing 30, with an evaluation unit 66, which is also arranged within the actuator housing 30 and which is electrically connected within the actuator housing 30 to the control electronic 28 of the actuator 24.

A sealed conduit 68, 70 leads respectively from the first opening 38 and the second opening 40 to a pressure sensor that serves as a differential pressure sensor 72 but which can also be used as two separate pressure sensors, which can also be mounted on the actuator housing 30, such as the differential pressure sensor 72, and which can be arranged in the actuator housing 30. The differential pressure sensor 72 is connected to the two conduits 68, 70 so that a differential pressure is directly measured between the first pressure measurement point 42 and the second pressure measurement point 44. The differential pressure sensor 72 is connected within the actuator housing 30 via electrical lines, such as the temperature sensor 62 is connected with the evaluation unit 66, which is in turn coupled with an engine control unit of the internal combustion engine via a connector 74 that is also used for the power supply of the actuator 24.

The measurement values of the differential pressure sensor 72 and the temperature sensor 62 are directly used to trigger and to control the flap body 18 by calculating in the evaluation unit a mass flow from the measured differential pressure and the measured temperature, wherein the mass flow is compared with the target value of the mass flow transmitted by the engine control unit. Corresponding to the existing difference, the flap body 18 is rotated in the following via the actuator 24 due to the generated control signal in the control electronic 28 in order to either further reduce the mass flow or to release an additional flow cross section. Due to the continuous transmission and calculation of the actual mass flow, the flap body 18 can very quickly be rotated into a position in which the target value corresponds to the calculated actual value without having to use a control signal at the actuator 24.

The existing flow is already reliably measured by the sensors 62, 72 for small flow cross sections due to the arrangement of the measurement point 42, 44, 60 in the duct 12.

The described flap device provides reliable and very precise measurement results of the pressure difference which can be used to adjust the actuator in a short time so that a very quick and direct control takes place. The measurement values and thus the control is also very precise for very small gas flows since in the area of the critical pressure measurement point in the third duct section the flow is measurable and rectified also for very small opening cross sections, and since the measurement values are not falsified by turbulences and the resulting pressure losses. The entire flap device can be pre-assembled. This leads to a signification reduction of emissions since the gas flows conveyed by the engine control unit can be adjusted very precisely and very quickly.

It should be clear that, compared to the described exemplary embodiment, various modifications are possible without going beyond the scope of protection of the present invention. It is, for example, possible to work with two individual pressure sensors instead of the differential pressure sensor, or the evaluation unit can be integrated into the engine control unit. The arrangement of the various measurement points can also be changed if required and does not depend on the form of the duct. The parallelism between the flap surface and the wall surface can also be shifted in an axial direction at least along the swivel area of the rear flap wing without going beyond the scope of protection of the present invention. Reference should also be had to the appended claims.

What is claimed is:

1. A flap device for an internal combustion engine, the internal combustion engine comprising a flow housing which comprises a housing wall which is configured to delimit a flow-through duct, the flap device comprising:
    a shaft mounted in the flow housing;
    a flap body rotatably mounted on the shaft, the flap body comprising a curved flap surface and a flap wing on which the curved flap surface is formed;
    an actuator configured to actuate the shaft;
    a pressure measurement point arranged,
        in a duct section of the flow housing so that the flap body traverses the pressure measurement point when rotating, and
        in a region of the flow housing which is remote from the shaft when viewed in a circumferential direction of the housing wall,
    wherein,
    in a cross section perpendicular to the shaft and running through the pressure measuring point, the curved flap surface directed towards the pressure measurement point is curved so that, in each rotary position of the flap body, a tangent arranged at the position of the curved flap surface having a shortest distance to an opposite wall surface of the flow housing is parallel to the opposite wall surface of the flow housing,
    the opposite wall surface of the flow housing comprises a suspension point arranged thereon,
    the flap wing comprises a middle area,
    the curved flap surface is only formed in the middle area of the flap wing when viewed along the shaft,
    the opposite wall surface of the flow housing comprises a curvature, and
    the curvature of the opposite wall surface corresponds to a curvature of the curved flap surface in each respective rotary position of the flap body as viewed in a circumferential direction from the suspension point.

2. The flap device as recited in claim 1, wherein,
    the flap body further comprises a swivel area, and
    the tangent arranged at the position of the curved flap surface having the shortest distance to the opposite wall surface of the flow housing is arranged, in each rotary position of the flap body, in a same axial flow cross section of the duct in the swivel area of the flap body.

3. The flap device as recited in claim 2, wherein the same axial flow cross section of the duct is arranged directly downstream of the pressure measurement point.

4. The flap device as recited in claim 1, wherein
    the flap wing, in a closed state of the flap device, is arranged directly downstream of the pressure measurement point on the suspension point on the opposite wall surface of the flow housing and is configured to move away from the pressure measurement point, and thus away from a closing position of the duct, when the flap body rotates.

5. The flap device as recited in claim 1, further comprising:
    a first duct section which comprises a first flow cross section;
    a second duct section arranged downstream of the first duct section, the second duct section comprising a second flow cross section which is reduced compared to the first flow cross section; and
    a third duct section arranged downstream of the second duct section in which the duct continues with the second flow cross section,
    wherein,
    the shaft is arranged in the third duct section, and
    the pressure measurement point is formed in the third duct section.

6. The flap device as recited in claim 5 further comprising:
    at least one pressure sensor; and
    a further pressure measurement point arranged in the first duct section,
    wherein,
    the pressure measurement point and the further pressure measurement point are each formed as an opening in the flow housing, and each of the openings are configured to be in a fluid communication with the at least one pressure sensor.

7. The flap device as recited in claim 1, wherein,
the shaft comprises bearing positions in the flow housing, and
the pressure measurement point is formed downstream of the bearing positions of the shaft in the flow housing.

8. The flap device as recited in claim 6, wherein,
a respective one of the at least one pressure sensor is arranged in each of the openings.

9. The flap device as recited in claim 6, wherein the at least one pressure sensor is a differential pressure sensor.

10. The flap device as recited in claim 6, wherein,
the actuator comprises a control electronic, and
the control electronic of the actuator is electrically coupled with the at least one pressure sensor.

11. The flap device as recited in claim 10, wherein an evaluation unit which is configured to calculate a gas flow from measurement values of the at least one pressure sensor is electronically coupled with the at least one pressure sensor and with the control electronic of the actuator.

12. The flap device as recited in claim 11, wherein the actuator is controlled based on the measurement values of the at least one pressure sensor.

13. The flap device as recited in claim 10, wherein the control electronic of the actuator and the at least one pressure sensor are each arranged in an actuator housing that is mounted on or integrally formed with the flow housing.

\* \* \* \* \*